United States Patent
Rahman et al.

(10) Patent No.: US 9,363,714 B2
(45) Date of Patent: *Jun. 7, 2016

(54) REDIRECTING HANDOVERS IN LTE NETWORKS

(71) Applicant: AT&T Intellectual Property I, L.P., Atlanta, GA (US)

(72) Inventors: Moshiur Rahman, Marlboro, NJ (US); Christopher Opara, Buford, GA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/658,996

(22) Filed: Mar. 16, 2015

(65) Prior Publication Data

US 2015/0189554 A1 Jul. 2, 2015

Related U.S. Application Data

(63) Continuation of application No. 14/147,221, filed on Jan. 3, 2014, now Pat. No. 9,008,664, which is a continuation of application No. 12/855,435, filed on Aug. 12, 2010, now Pat. No. 8,644,832.

(51) Int. Cl.
*H04W 36/00* (2009.01)
*H04W 24/04* (2009.01)
(Continued)

(52) U.S. Cl.
CPC .......... *H04W 36/0016* (2013.01); *H04W 24/04* (2013.01); *H04W 36/0022* (2013.01);
(Continued)

(58) Field of Classification Search
CPC ................... H04W 36/0055; H04W 36/0083; H04W 36/0022; H04W 36/08; H04W 36/0016; H04W 36/0033; H04W 36/00; H04W 36/30; H04W 36/14
USPC .......................... 455/436–445; 370/328–333
See application file for complete search history.

(56) References Cited

U.S. PATENT DOCUMENTS 6,353,902 B1 3/2002 Kulatunge et al.
6,564,227 B2 5/2003 Sakakibara et al.
(Continued)

FOREIGN PATENT DOCUMENTS

WO A12009084864 7/2009
WO A12010017961 2/2010

OTHER PUBLICATIONS

Office Action dated Mar. 23, 2012 for U.S. Appl. Serial No. 12/577,899, 25 pages.
(Continued)

*Primary Examiner* — Olumide T Ajibade Akonai
(74) *Attorney, Agent, or Firm* — Amin, Turocy & Watson, LLP

(57) ABSTRACT

An architecture that can redirect communications upon detection of a handover failure in a Long Term Evolution (LTE) network is described. The architecture can obtain information indicative of a handover failure that is available in a first portion of the LTE network (e.g., a serving gateway) that has no control over the communication path. The architecture can utilize the information to instruct a second portion of the LTE network (e.g., a mobility management entity), one that can control the communication path but conventionally has no access to the handover information, to reroute the communication path to avoid unresponsive or failing network entities.

20 Claims, 11 Drawing Sheets

(51) Int. Cl.
  *H04W 40/20* (2009.01)
  *H04W 40/36* (2009.01)
  *H04W 28/04* (2009.01)

(52) U.S. Cl.
  CPC ...... *H04W36/0055* (2013.01); *H04W 36/0083* (2013.01); *H04W 40/20* (2013.01); *H04W 40/36* (2013.01); *H04W 28/04* (2013.01)

(56) References Cited

U.S. PATENT DOCUMENTS

| | | | |
|---|---|---|---|
| 7,080,294 | B1 | 7/2006 | Weber et al. |
| 8,280,381 | B2 | 10/2012 | Zhu et al. |
| 8,483,174 | B2 | 7/2013 | Ahmavaara et al. |
| 8,644,832 | B2 * | 2/2014 | Rahman ............ H04W 36/0055 370/328 |
| 9,008,664 | B2 * | 4/2015 | Rahman ............ H04W 36/0055 370/328 |
| 2002/0123365 | A1 | 9/2002 | Thorson et al. |
| 2003/0207687 | A1 | 11/2003 | Svedevall et al. |
| 2008/0162981 | A1 | 7/2008 | Jajoo et al. |
| 2008/0192697 | A1 | 8/2008 | Shaheen et al. |
| 2008/0227455 | A1 | 9/2008 | Kim et al. |
| 2009/0149180 | A1 | 6/2009 | Kitazoe et al. |
| 2009/0180451 | A1 | 7/2009 | Alpert et al. |
| 2010/0142367 | A1 | 6/2010 | Zhang et al. |
| 2010/0208681 | A1 | 8/2010 | Elmaleh et al. |
| 2010/0226267 | A1 | 9/2010 | Jang et al. |
| 2010/0267378 | A1 | 10/2010 | Hamabe et al. |
| 2011/0021154 | A1 | 1/2011 | Marinier et al. |
| 2011/0110225 | A1 | 5/2011 | Mihaly et al. |
| 2011/0188468 | A1 | 8/2011 | Vikberg et al. |
| 2011/0194427 | A1 | 8/2011 | Shirota et al. |
| 2012/0039299 | A1 | 2/2012 | Teyeb et al. |

OTHER PUBLICATIONS

Office Action dated Sep. 11, 2012 for U.S. Appl. No. 12/577,899, 27 pages.
Office Action dated Sep. 21, 2012 for U.S. Appl. No. 12/855,435, 95 pages.
Notice of Allowance mailed dated Oct. 2, 2013 for U.S. Appl. No. 12/855,435, 22 pages.
Office Action dated May 20, 2014 for U.S. Appl. No. 14/147,221, 22 Pages.
Office Action dated Aug. 13, 2014 for U.S. Appl. No. 12/577,899, 39 pages.
Final Office Action dated Feb. 9, 2015 for U.S. Appl. No. 12/577,899, 46 pages.
Notice of Allowance dated Dec. 17, 2014 for U.S. Appl. No. 14/147,221, 17 pages.

* cited by examiner

REDIRECTING HANDOVERS IN LTE NETWORKS

CROSS-REFERENCE TO RELATED APPLICATIONS

This application is a continuation of, and claims priority to each of, U.S. patent application Ser. No. 14/147,221 (now U.S. Pat. No. 9,008,664), entitled, "REDIRECTING HANDOVERS IN LTE NETWORKS", filed Jan. 3, 2014, which is a continuation of U.S. Pat. No. 8,644,832, entitled, "REDIRECTING HANDOVERS IN LTE NETWORKS", filed Aug. 12, 2010. The entireties of these applications are hereby incorporated herein by reference.

TECHNICAL FIELD

The present application relates generally to Long-Term Evolution (LTE) communications networks, and more specifically to utilizing a mobility management entity (MME) for redirecting handovers that might otherwise fail.

BACKGROUND

Conventional wireless networks typically provide for handover operations or transactions in which a mobile device switches from a first channel to a second channel. Handover transactions can occur for a variety of reasons, some of the more common of which are to enable the mobile device to maintain a call or data session even when traveling in and out of the effective ranges of cells; to enable interoperability of disparate network technologies; to allow more efficient sharing of network resources; to avoid interference, or to better suit behavior such as high travel speed or to enable required or desired features or services.

Regardless of the purpose or nature of the handover transaction, in some cases, handover transactions end in a failure for one reason or another. In modern Long Term Evolution (LTE) communication networks, evidence of handover failures can be determined by an associated serving gateway, however, in LTE networks, the serving gateway has no control over the communication path that is selected, and therefore cannot take any suitable action to remedy the problem. As a result, a call or other data session can be dropped by the LTE network, leading to customer dissatisfaction. Accordingly, conventional LTE networks do not adequately handle handover failures with respect to maintaining a call in spite of a handover failure. For example, an eNB (or other network entity) can fail to accept a handover due to one or more issues associated with the eNB (or other network entity), even though that eNB has been selected to receive the handover.

DETAILED DESCRIPTION

Figure 1:
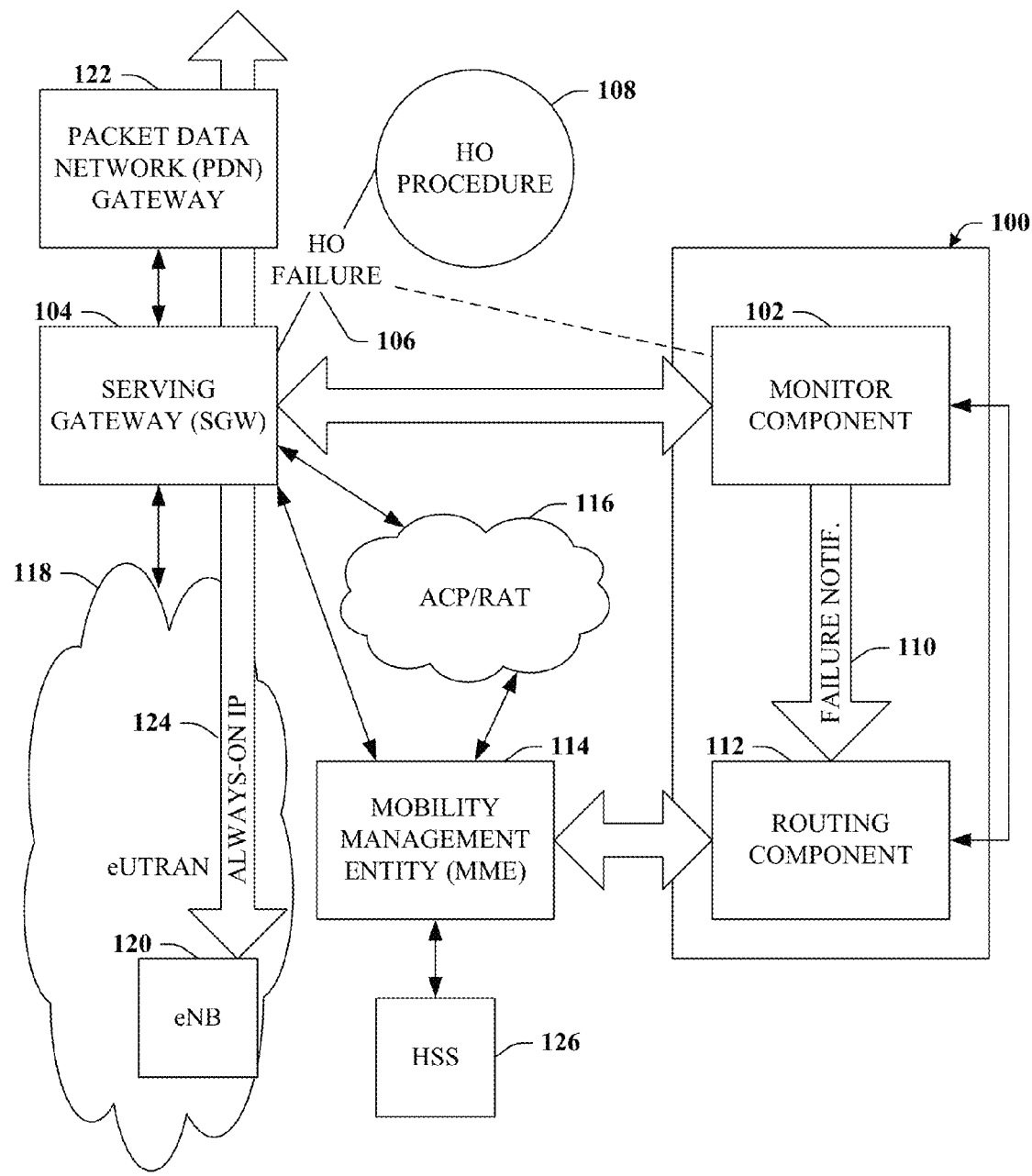
FIG. 1 is a block diagram of a system that can redirect communications such as mobile handset calls, data sessions, or other transactions, upon detection of a handover failure in a Long Term Evolution (LTE) network.

The subject matter disclosed herein, in one aspect thereof, comprises an architecture that can redirect communications such as calls or data sessions upon detection of a handover failure in a Long Term Evolution (LTE) network prior to dropping or otherwise losing the call or data session. In accordance therewith and to other related ends, the architecture can include a monitor component that can be operatively coupled to a serving gateway of a LTE-access network. Thus, the monitor component can be configured to identify a handover failure (or abnormalities that could lead to a handover failure) associated with a particular LTE handover procedure, given that in LTE networks serving gateways have access to data that can be employed to detect the occurrence of a handover failure. Upon identification of a handover failure, the monitor component can therefore generate a failure notification, including relevant information relating to the handover failure.

In addition, the architecture can include routing component that can be operatively coupled to a mobility management entity (MME) of the LTE-access network. Since the MME in an LTE network can authorize bearers and/or select network entities to carry a particular communication, the routing component can be configured to instruct the MME to select an alternative communication path upon receipt of the failure notification.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

As used in this application, the terms "system," "component," "interface," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Further, terms like "user equipment," "mobile station," "mobile," subscriber station," "access terminal," "terminal," "handset," and similar terminology, generally refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "cell site," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Referring now to the drawing, with reference initially to FIG. 1, system 100 that can redirect communications (e.g., mobile handset calls, data sessions, or other transactions) upon detection of a handover failure in a Long Term Evolution (LTE) network is depicted. Generally, system 100 can include monitor component 102 that can be operatively or communicatively coupled to serving gateway 104 of a LTE-access network, which is further detailed infra. Monitor component 102 can be configured to identify failure 106 associated with a particular LTE handover procedure 108. For example, based upon the role serving gateways (e.g., serving gateway 104) play in LTE networks, these serving gateways are in a position to determine or detect evidence of handover failure occurrences, even though the serving gateways are not able to rectify or alleviate the issue. Thus, monitor component 102 can leverage the ability of serving gateway 104 to detect evidence of handover failure 106. Accordingly, when such evidence of handover failure 106 is detected by serving gateway 104, monitor component 102 can identify the failure and provide failure notification 110.

In addition, system 100 can further include routing component 112, which can be the recipient of failure notification 110. As with monitor component 102, routing component 112 can also be coupled to one or more core components of an LTE access network. Yet, in this case, routing component 112 can be operatively or communicatively coupled to mobility management entity (MME) 114 of the LTE-access network. One role of MMEs (e.g., MME 114) in conventional LTE networks is to authorize bearers for communication paths and/or select suitable serving gateways or other network entities. However, since MMEs do not manage data packets or the like, MMEs in traditional LTE networks have no way of knowing that a handover procedure has failed. Thus, routing component 112, upon receipt of failure notification 110, can be configured to instruct MME 114 to select alternative communication path (ACP) 116. Hence, in broad terms, monitor component 102 can leverage information (e.g., information relating to handover failure 106) inherently available to serving gateway 104, while routing component 112 can leverage inherent capabilities (e.g., to select communication paths) of MME 114 that, when combined, can provide features not available in conventional LTE networks such as, e.g., redirecting a call or data session to alternative communication path 116.

In more detail, LTE networks include a core network, denoted evolved packet core (EPC) and an associated air interface, denoted evolved UMTS (Universal Mobile Telecommunications System) Terrestrial Radio Access Network or eUTRAN (e.g., eUTRAN 118). The air interface or eUTRAN can include a set of evolved Node B (eNB) elements (e.g., eNB 120) that interface to user equipment (UE) such as mobile handsets or the like. Likewise, the EPC can include a set of serving gateways, a MME, and a set of packet data network (PDN) gateways (e.g., PDN gateway 122).

Traditionally, the MME operates as the control-plane function for eUTRAN access and/or is the key control-node for the LTE access-network. The MME is responsible for authentication and critical management for mobile devices as well as for tracking and paging procedures for mobile devices in idle mode. Moreover, the MME authorizes bearer activation/deactivation including serving gateway and PDN gateway selection. Likewise, the serving gateway operates as a local mobility anchor for eUTRAN mobility, switching packets between the S5/S8 interface and the General Radio Packet System (GPRS) Tunneling Protocol (GTP)-based S1-U interface for mobile devices in connected mode. For mobile devices in idle mode, the serving gateway is responsible for terminating the down-link data path and when down-link data is received. On the other hand, the PDN gateway can operate as the permanent Internet Protocol (IP) point-of-attachment for access via the eUTRAN. The PDN gateway performs IP policy and charging enforcement on packet flows to and from mobile devices. The same access point name (APN) concepts from a UTRAN packet switching core network apply, allowing a mobile device to have simultaneous connectivity to multiple PDNs.

A characteristic of modern LTE networks is that these networks seek to leverage existing broadband infrastructure, and operate as an all-IP system. Hence, eNBs, serving gateways, and PDN gateways are all coupled via an always-on IP connection, which is illustrated by reference numeral 124. Therefore, serving gateway 104 can be aware of any abnormalities associated with such network elements (e.g., often eNB 120) involved in handover procedure 108 as well as actual handover failures 106. Such information (e.g., failure notification 110) can be provided to routing component 112, which can then instruct MME 114 to select alternate communication path 116, as detailed supra.

In one or more aspect, routing component 112 can instruct MME 114 to select an alternate radio access technology (RAT) for the alternate communication path 116. The alternate RAT, also denoted by reference numeral 116 can be substantially any suitable access technology, but will generally differ from LTE-based eUTRAN 118. Thus, in the event of handover failure 106 in the LTE network, MME 114 can select some (typically non-LTE) other appropriate RAT 116. For example, the alternate RAT 116 can be associated with at least one of a second generation partnership project (2GPP) communication standard, a third generation partnership project (3GPP) communication standard, or a satellite-based communication standard. Thus, UE with LTE service provision that experience issues that can lead to a dropped connection can be instead rerouted to other access technologies prior to losing the connection and/or service. These alternate RATs 116, being independent of eUTRAN 118 will typically not be subject to the same network issues, and therefore can be leveraged as a failsafe of sorts.

Figure 2:
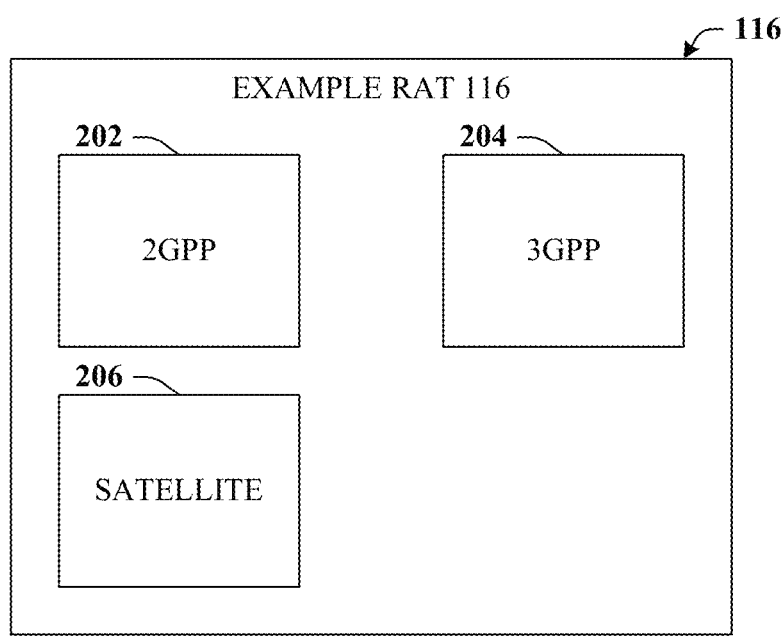
FIG. 2 provides a block diagram of various examples of alternative radio access technologies (RAT).

Examples of alternative RATs 116 are provided with reference to FIG. 2. In particular, and as noted supra, MME 114 can select 2GPP 202, 3GPP 204, satellite 206, or any other suitable access technology with which an associated UE is equipped to utilize.

Figure 3:
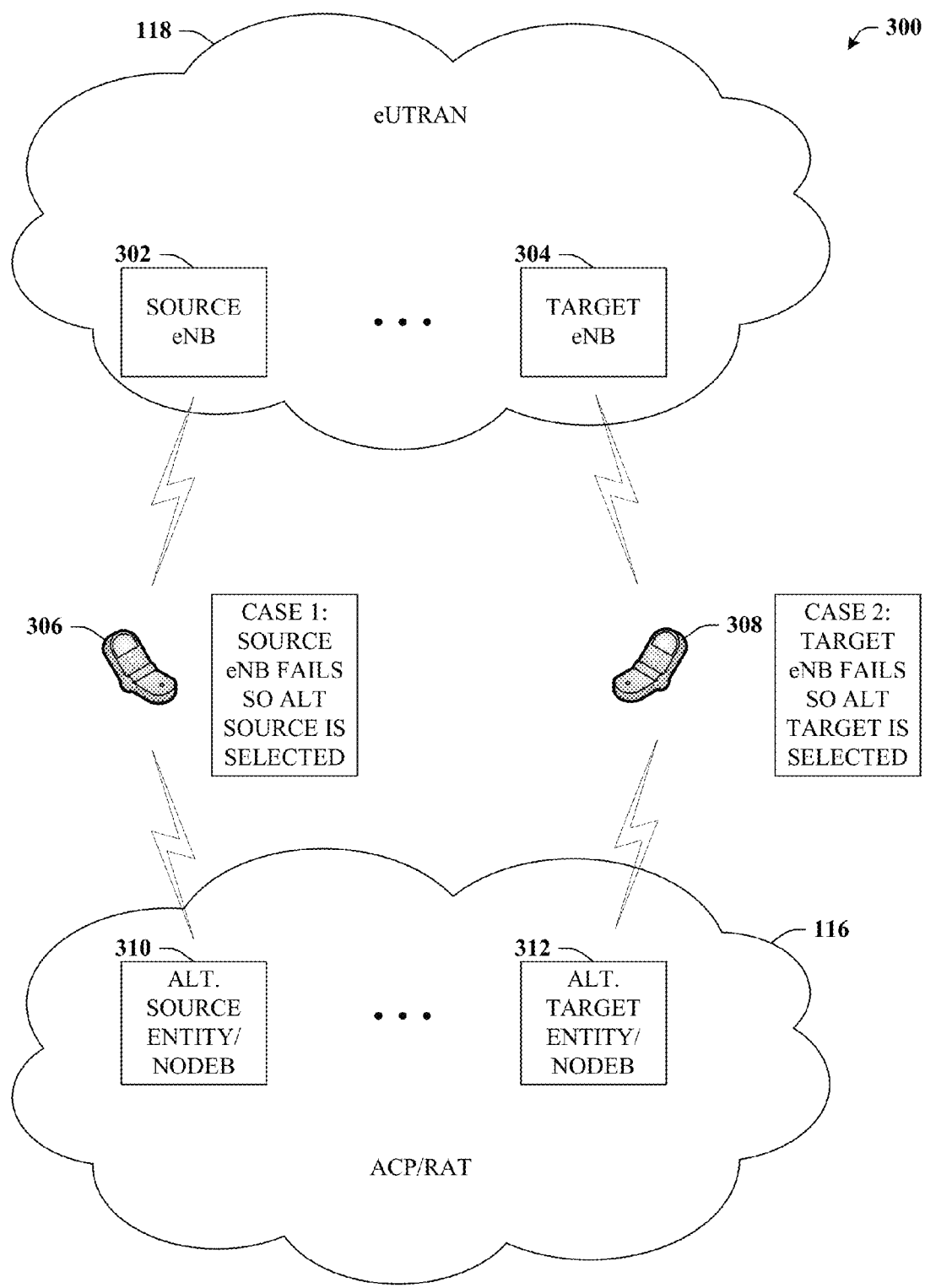
FIG. 3 illustrates a graphic depiction that illustrates two example situations in which a handover can fail.

While still referring to FIG. 1, but turning now also to FIG. 3, graphic depiction 300 illustrates two example situations in which a handover can fail. As depicted, eUTRAN 118 can comprise a plurality of eNBs, including source eNB 302 and target eNB 304, which respectively serve source UE 306 and target UE 308. As previously mentioned, routing component 112 can be configured to instruct MME 114 to select an ACP 116 upon receipt of failure notification 110. Thus, in a first case handover failure 106 is associated with source eNB 302, in which case alternate source entity 310 of an associated RAT 116 can be selected to avoid the issues being experienced by source eNB 302. In a second case, handover failure 106 arises with respect to target eNB 304. Thus, alternate target entity 312 of some suitable RAT 116 can be selected to substitute for failing target eNB 304. Appreciably, when handover procedures fail due to substantially any reason, serving gateway 104 is capable of detecting evidence of such a failure and/or any other abnormality, which can be identified by monitor component 102.

In accordance therewith, in one or more aspect of the disclosed subject matter, monitor component 102 can identify handover failure 106 based upon an unavailability condition associated with target eNB 304. As another example, monitor component 102 can identify handover failure 106 based upon a degraded air interface (e.g., eUTRAN) between UE (e.g., UE 306 and/or 308) and either source eNB 302 or target eNB 304. As a third example, monitor component 102 can identify handover failure 106 based upon a buffer overflow condition or a packet loss condition associated with at least one of source eNB 302 or target eNB 304. In addition, as a fourth example, monitor component 102 can identify handover failure 106 based upon a threshold crossing alarm (TCA) count associated with at least one of source eNB 302 or target eNB 304, which is further detailed in connection with FIG. 4, infra. Furthermore, it should be appreciated that handover failure 106 can be associated with substantially any type of LTE handover procedure 108. For example, LTE handover procedure can be directed to a backward handover initiated by source eNB 402 or to a forward handover initiated by UE.

Continuing the discussion of FIG. 1, as noted, monitor component 102 can identify handover failure 106 and transmit failure notification 110 to routing component 112, which in turn can then instruct MME 114 to select ACP 116 in order to, e.g., bypass the failing network entity or entities. In addition, in one or more aspect, routing component 112 can further instruct MME 114 to interact with home subscriber server (HSS) 126. Typically, HSS 126 operates as a master user database that supports network entities that handle calls or other data sessions. The HSS 126 can include subscription-related information such as subscriber profiles, can perform authentication and authorization of users, and can provide information about a subscriber's location or IP information. The above-mentioned interaction between MME 114 and HSS 126 can be accomplished by way of non-access stratum (NAS) signaling, and the NAS signaling interaction can be for the purposes of determining parameters associated with quality of service (QoS) and/or service level agreement (SLA) in connection with the provisioned service that is experiences difficulties. As a result, MME 114 can choose a most appropriate ACP/RAT 116 when redirecting the failed handoff, which can be accomplished prior to losing a network data connection (e.g., dropping a call).

Figure 4:
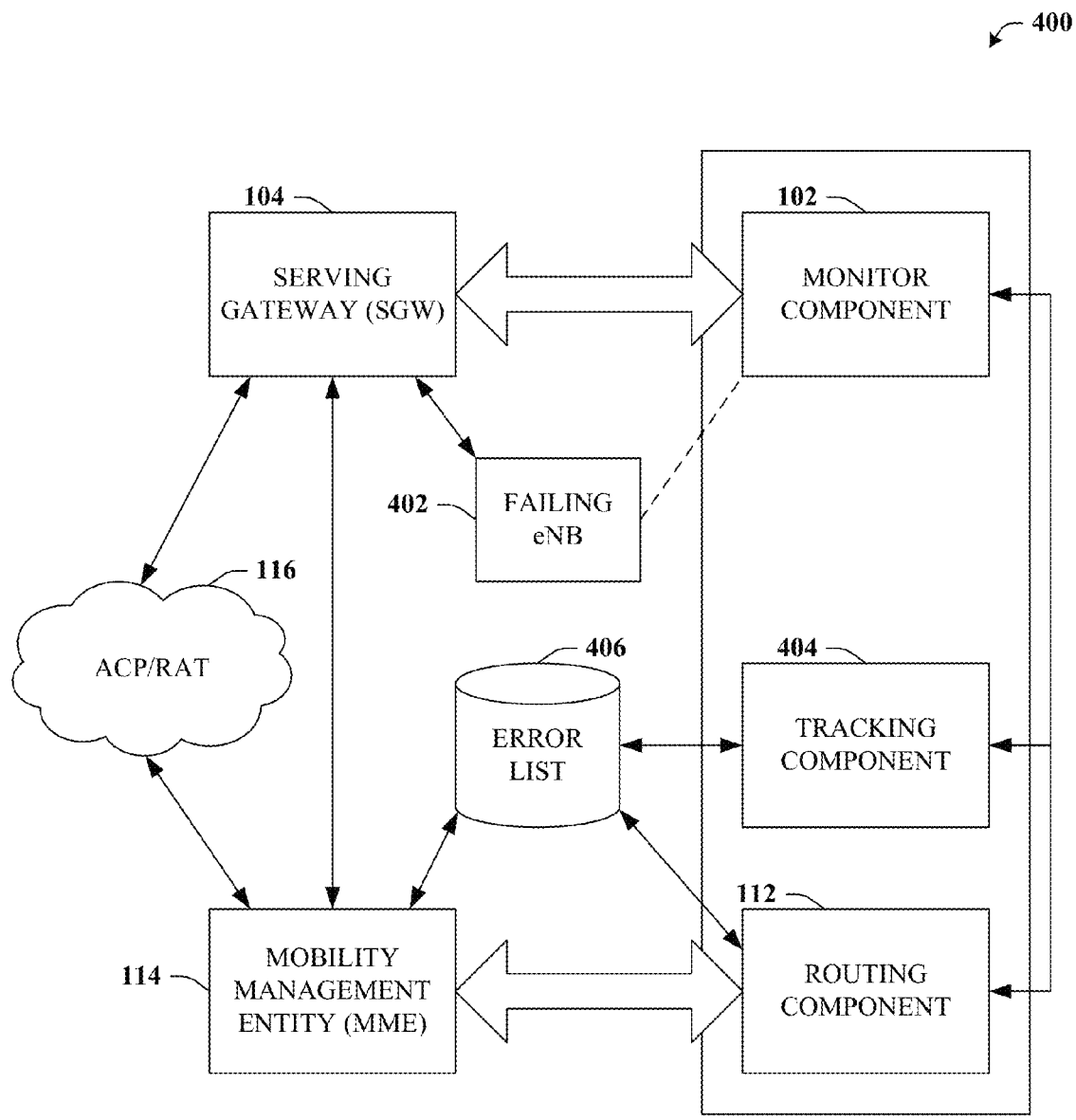
FIG. 4 is a block diagram of a system that can predict handover difficulties in a LTE network and reroute the communication path in response.

With reference now to FIG. 4, system 400 that can predict handover difficulties in a LTE network is provided. Broadly, system 400 intended to represent an alternate embodiment of, and to be substantially similar to, system 100 of FIG. 1. However, whereas system 100 is directed to early response to handover failure 106, system 400 is directed to preemptive activity such that handover failure 106 can be predicted in advance as well. Hence, as with system 100, system 400 can include monitor component 102 that can be operatively coupled to serving gateway 104 of a LTE-access network, wherein monitor component 102 can be configured to identify failing eNB 402 that is potentially unable to accept a LTE-based handover and/or that may not be capable of sustaining a data connection. System 400 can also include routing component 112 as substantially described in connection with FIG. 1. Specifically, routing component 112 can be operatively coupled to MME 114 of the LTE-access network, wherein routing component 112 can be configured to instruct MME 114 to select an alternative communication path 116 upon receipt of a LTE handover request associated with failing eNB 402.

In addition, system 400 can further include tracking component 404 that can store information associated with failing eNB 402, for instance, to a data store or error list 406. Thus, all the evidentiary data available to serving gateway 104 discussed previously, e.g., unavailability, buffer overflow, packet loss and so on, can be actively tracked and stored in a real-time database, such as error list 406. Such information can be employed, e.g., to determine whether or not a target eNB is capable of accepting a handover rather than examining such information after failing eNB 402 has generated a handover failure. In particular, monitor component 102 can identify failing eNB 402 based upon a TCA count associated with failing eNB 402. Such data can be recorded in error list, and be maintained with respect to failing eNB 402 until the issue is corrected and/or no longer exists, in which case the entry in error list 406 relating to failing eNB 402 can be cleared. In the meantime, should MME 114 otherwise attempt to select failing eNB as a recipient of a handover or otherwise involved in a handover transaction, routing component 112 can alert MME 114 of the potential for a fault and instruct MME 114 to select an ACP 116 instead of failing eNB 402.

Similarly, monitor component 102 can identify failing eNB 402 based upon a degraded air interface between UE and failing eNB 402 or based upon a buffer overflow condition or a packet loss condition associate with failing eNB 402. In either case, this information can be stored to error list 406 and referenced should eNB at issue be selected during a handover procedure as detailed supra.

As with other portions of this disclosure, in this case routing component 112 can instruct MME 114 to select alternate RAT 116 for the alternative communication path 116, wherein alternate RAT 116 differs from an LTE-based eUTRAN. For example, alternate RAT 116 can be associated with at least one of a 2GPP communication standard, a 3GPP communication standard, a satellite-based communication standard, or another suitable access technology communication standard or technique. Regardless, based upon the above, MME 114 can employ alternate RAT 116 to bypass failing eNB 402 in connection with the LTE-based handover.

Figure 5:
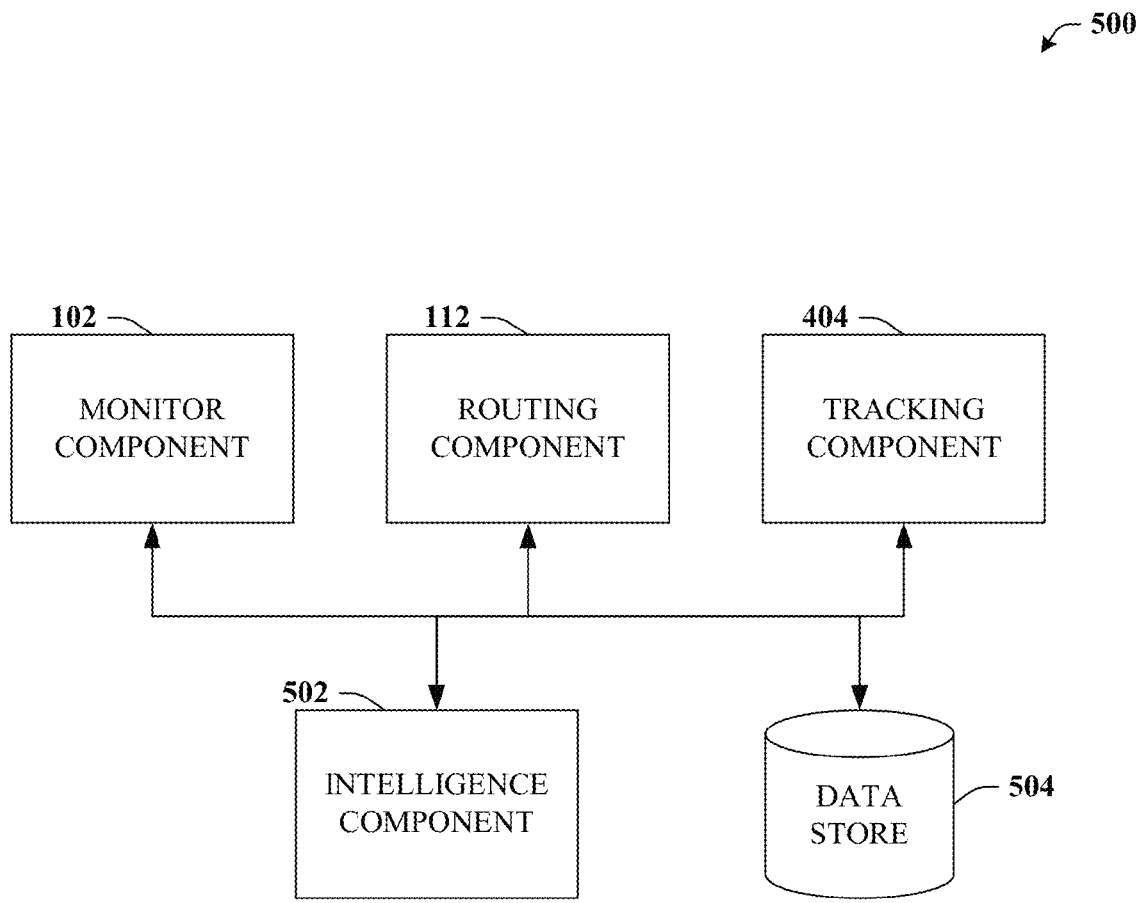
FIG. 5 illustrates a block diagram of a system that can perform or aid with various determinations or inferences.

Now turning to FIG. 5, system 500 that can perform or aid with various determinations or inferences is illustrated. Generally, system 500 can include monitor component 102, routing component 112, tracking component 404, as well as other components described herein. In addition to what has been described, the above-mentioned components can make intelligent determinations or inferences. For example, Bayesian probabilities or confidence measures can be employed or inferences can be based upon machine learning techniques related to historical analysis, feedback, and/or previous determinations or inferences.

For instance, fault monitor component 102 can intelligently determine or infer indicia of a failing eNB 402, e.g., based upon TCA counts, or based upon QoS, noise, latency, and so forth. Likewise, routing component 112 can intelligently determine or infer a suitable ACP/RAT 116 based upon subscriber profiles or the like. In addition, tracking component 404 can intelligently determine or infer whether or not to update error list 406 based upon, e.g., time, recovery operations, etc. Regardless of the actual intelligent determination or inference, as noted, such can be based upon historical analysis, probabilistic inferences or machine learning techniques.

In addition, system 500 can also include intelligence component 502 that can provide for or aid in various inferences or determinations. In particular, in accordance with or in addition to what has been described supra with respect to intelligent determinations or inferences provided by various components described herein, e.g., all or portions of monitor component 102, routing component 112, or tracking component 404. Additionally or alternatively, all or portions of intelligence component 502 can be included in one or more components described herein. Thus, intelligence component 502 can reside in whole or in part within system 100 or system 400 or within components described therein.

Moreover, intelligence component 502 will typically have access to all or portions of data sets described herein, such as data store 504. As used herein, data store 504 is intended to be a repository of all or portions of data, data sets, or information described herein or otherwise suitable for use with the described subject matter (e.g., user profiles, service agreements, history, network traffic data either current or historical, device types/capabilities, etc.). Data store 504 can be centralized, either remotely or locally cached, or distributed, potentially across multiple devices and/or schemas. Furthermore, data store 504 can be embodied as substantially any type of memory, including but not limited to volatile or non-volatile, sequential access, structured access, or random access and so on. It should be understood that all or portions of data store 504 can be included in systems 100 or 400, or can reside in part or entirely remotely from systems 100 or 400.

In more detail, in order to provide for or aid in the numerous inferences described herein, intelligence component 502 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the disclosed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 6:
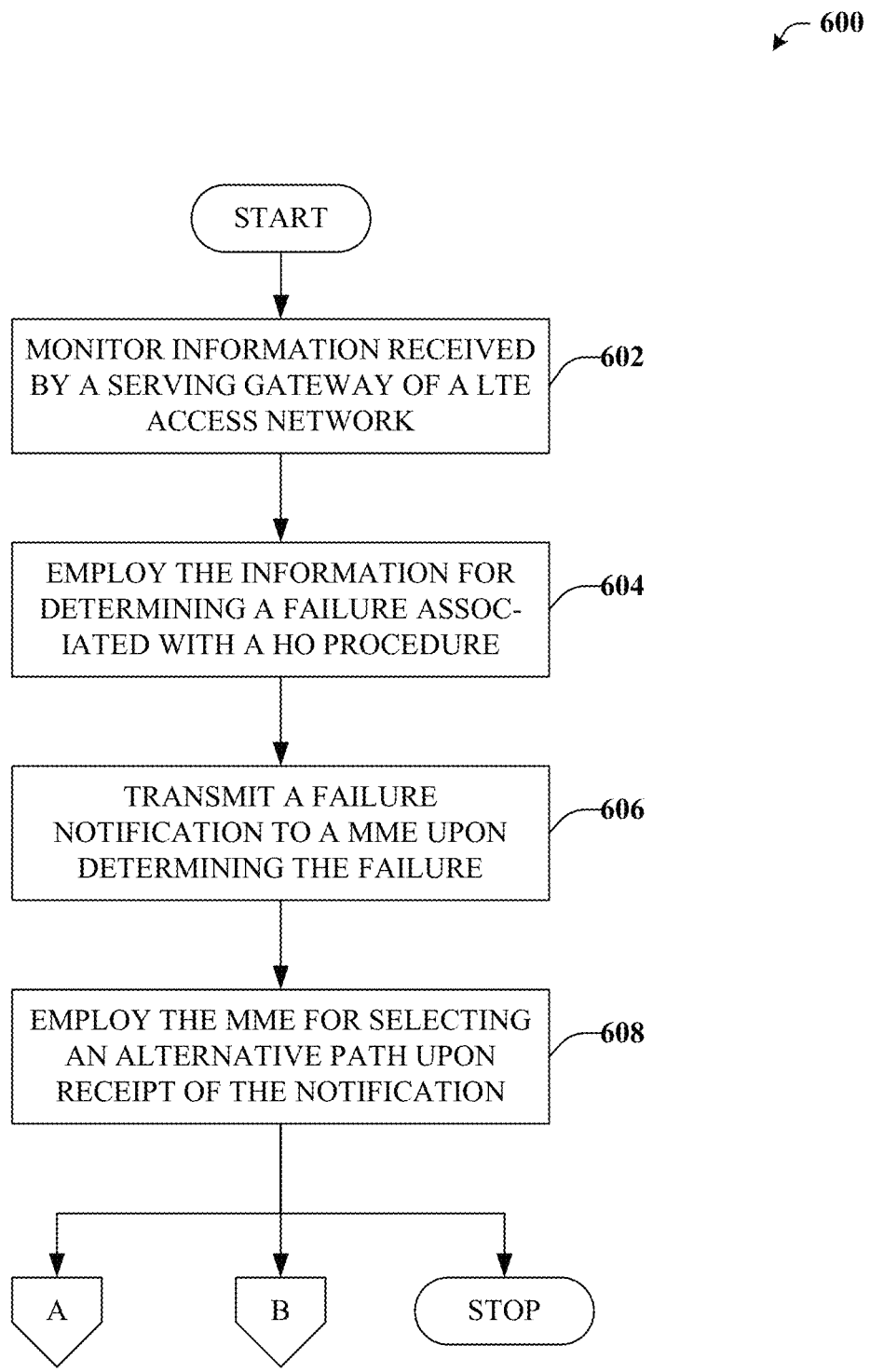
FIG. 6 depicts an exemplary flow chart of procedures defining a method for rerouting handover transactions in a LTE network.
Figure 7:
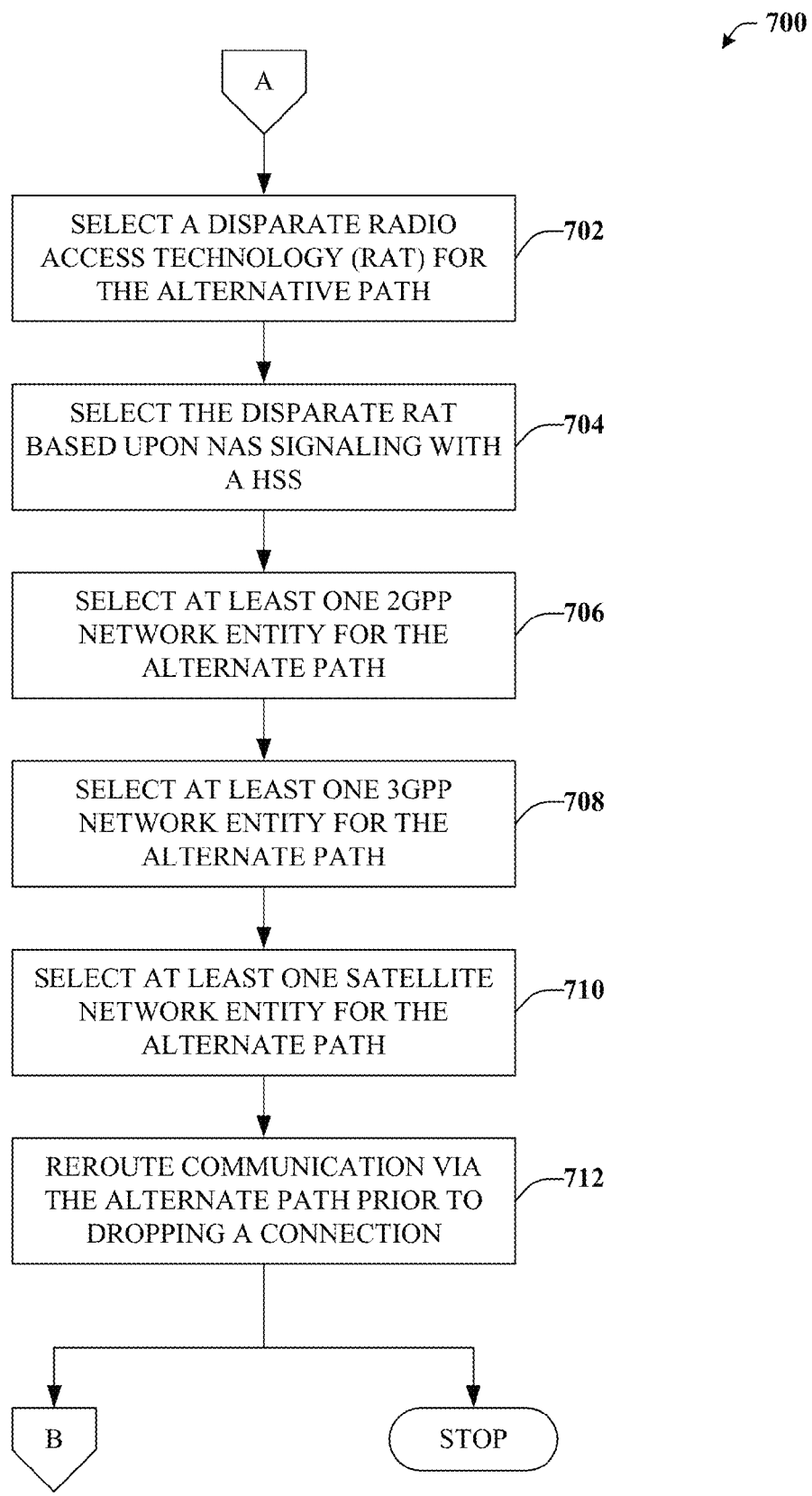
FIG. 7 is an exemplary flow chart of procedures that define a method for providing additional features or aspects in connection with selecting an alternative communication path.
Figure 8:
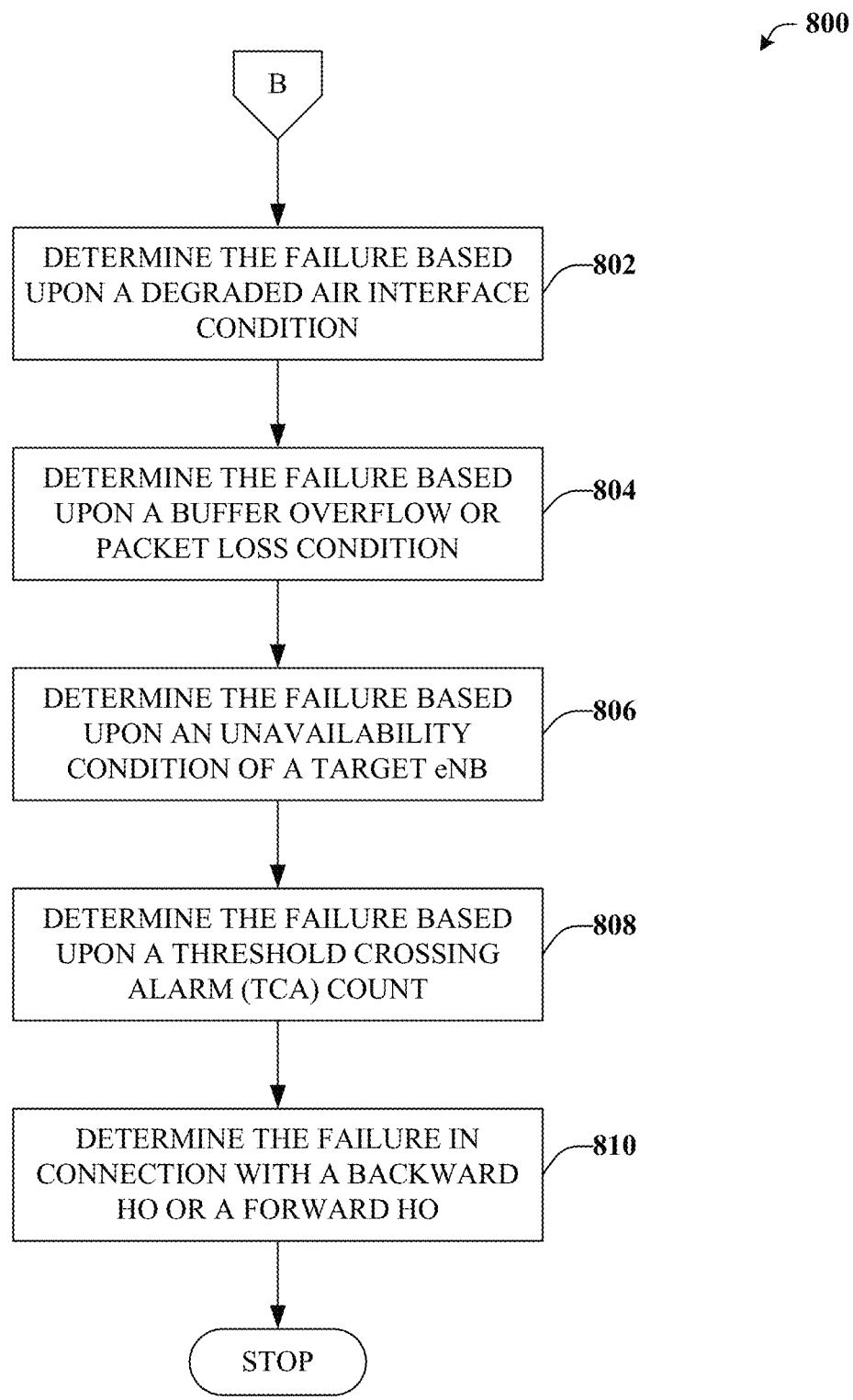
FIG. 8 depicts an exemplary flow chart of procedures defining a method for providing additional features or aspects in connection with identifying and/or determining a handover failure.

FIGS. 6-8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Turning now to FIG. 6, exemplary method 600 for rerouting handover transactions in a LTE network is depicted. Generally, at reference numeral 602, information received by a serving gateway of a LTE-access network can be monitored, which can include substantially any information relating to abnormalities that can lead to handover failure or degraded service, examples of which are detailed in connection with FIG. 8, infra.

Accordingly, the information received at reference numeral 602 can, at reference numeral 604, be employed for determining a failure associated with a LTE handover procedure. In accordance therewith, at reference numeral 606, a failure notification can be transmitted to a MME upon determining the handover failure. Hence, at reference numeral 608, the MME can be employed for selecting an alternative communication path upon receipt of the failure notification. Additional features, aspects, or examples of the selection process or the alternative communication path are provided with reference to FIG. 7, below.

Turning now to FIG. 7, exemplary method 700 for providing additional features or aspects in connection with selecting an alternative communication path is illustrated. At reference numeral 702, a disparate radio access technology (RAT) is selected for the alternative communication path. Appreciably, the RAT can be substantially any suitable technology a particular UE is equipped to utilize, yet will typically be disparate from the eUTRAN technology employed by the underlying LTE service. Moreover, at reference numeral 704, the disparate RAT can be selected based upon non-access stratum (NAS) signaling associate with a HSS network entity. Thus, upon interacting with the HSS, the MME can obtain useful information in determining the most suitable RAT for the particular case at hand.

By way of example, at reference numeral 706, at least one 2GPP network entity can be selected for the alternative communication path. As a second example, at reference numeral 708, at least one 3GPP network entity can be selected for the alternative communication path. As a third example, at reference numeral 710, at least one satellite network entity can be selected for the alternative communication path. However, regardless of the type or nature of the alternative communication path, at reference numeral 712, all communication otherwise intended for the original (e.g., failing) communication path can be rerouted via the alternate communication path prior to dropping a network data connection.

With reference now FIG. 8, exemplary method 800 for providing additional features or aspects in connection with identifying and/or determining a handover failure is depicted. In general, at reference numeral 802, the handover failure determined in connection with reference numeral 604 of FIG. 6 can be determined based upon a degraded air interface condition between UE and a source eNB or between UE and a target eNB.

Likewise, at reference numeral 804, the handover failure can be determined based upon a buffer overflow condition or a packet loss condition associated with at least one of a source eNB or a target eNB. Similarly, at reference numeral 806, the handover failure can be determined based upon an unavailability condition associated with a target eNB. Moreover, at reference numeral 808, the handover failure can be determined based upon a TCA count associated with at least one of a source eNB or a target eNB. Appreciably, any such handover failure can be determined in connection with a backward handover initiated by a source eNB or with a forward handover initiated by UE, as discussed in connection with reference numeral 810.

Figure 9:
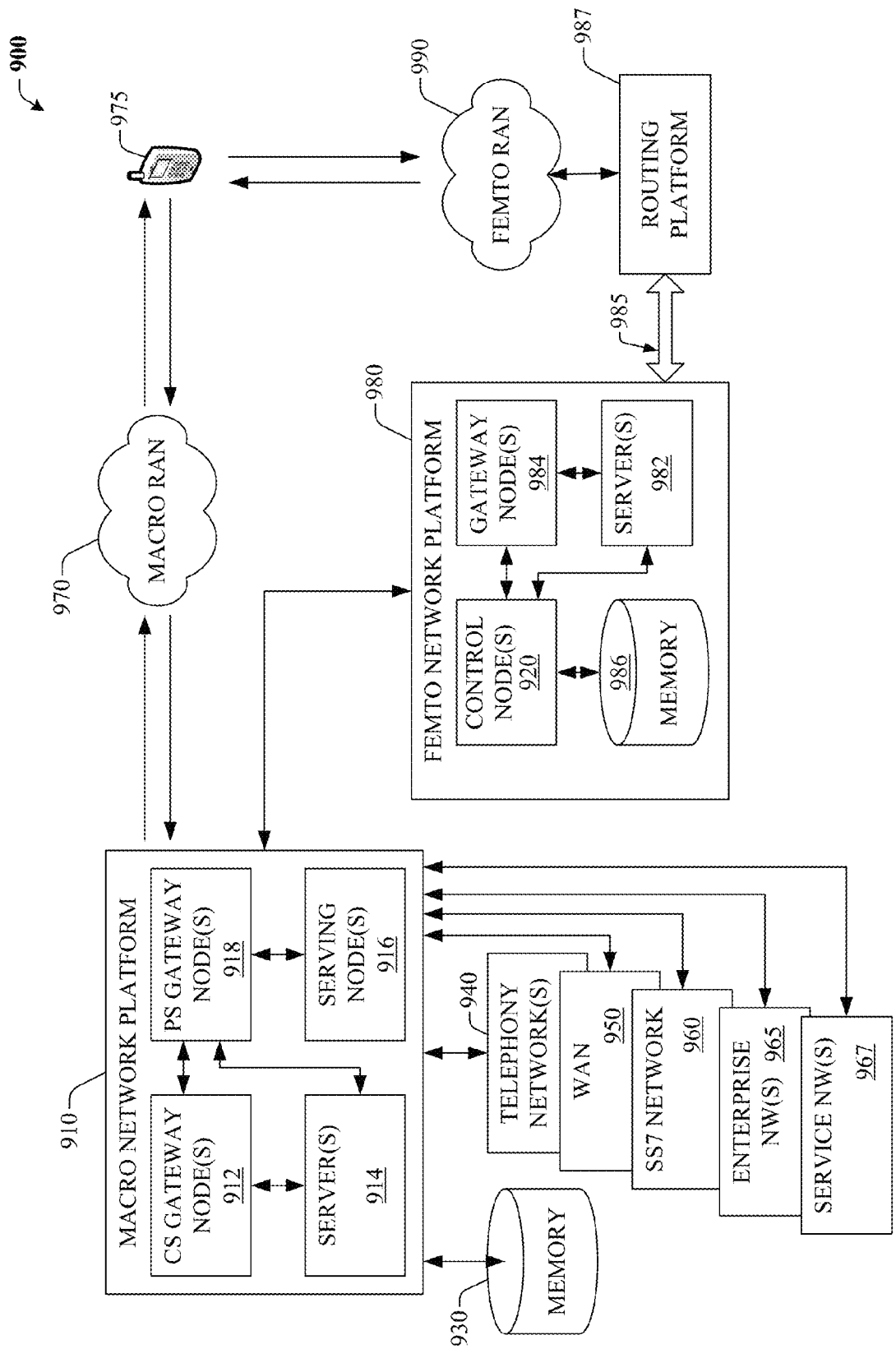
FIG. 9 illustrates an example wireless communication environment with associated components that can enable operation of an enterprise network in accordance with aspects described herein.

To provide further context for various aspects of the subject specification, FIG. 9 illustrates an example wireless communication environment 900, with associated components that can enable operation of a femtocell enterprise network in accordance with aspects described herein. Wireless communication environment 900 includes two wireless network platforms: (i) A macro network platform 910 that serves, or facilitates communication) with user equipment 975 via a macro radio access network (RAN) 970. It should be appreciated that in cellular wireless technologies (e.g., 4G, 3GPP UMTS, HSPA, 3GPP LTE, 3GPP UMB), macro network platform 910 is embodied in a Core Network. (ii) A femto network platform 980, which can provide communication with UE 975 through a femto RAN 990, linked to the femto network platform 980 through a routing platform 92 via backhaul pipe(s) 985, wherein backhaul pipe(s) are substantially the same a backhaul link 3853 below. It should be appreciated that femto network platform 980 typically offloads UE 975 from macro network, once UE 975 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 970 can comprise various coverage cells like cell 1205, while femto RAN 990 can comprise multiple femto access points. As mentioned above, it is to be appreciated that deployment density in femto RAN 990 is substantially higher than in macro RAN 970.

Generally, both macro and femto network platforms 910 and 980 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 910 includes CS gateway node(s) 912 which can interface CS traffic received from legacy networks like telephony network(s) 940 (e.g., public switched telephone network (PSTN), or public land mobile network (PLMN)) or a SS7 network 960. Circuit switched gateway 912 can authorize and authenticate traffic (e.g., voice) arising from such networks. Additionally, CS gateway 912 can access mobility, or roaming, data generated through SS7 network 960; for instance, mobility data stored in a VLR, which can reside in memory 930. Moreover, CS gateway node(s) 912 interfaces CS-based traffic and signaling and gateway node(s) 918. As an example, in a 3GPP UMTS network, gateway node(s) 918 can be embodied in gateway GPRS support node(s) (GGSN).

In addition to receiving and processing CS-switched traffic and signaling, gateway node(s) 918 can authorize and authenticate PS-based data sessions with served (e.g., through macro RAN) wireless devices. Data sessions can include traffic exchange with networks external to the macro network platform 910, like wide area network(s) (WANs) 950; it should be appreciated that local area network(s) (LANs) can also be interfaced with macro network platform 910 through gateway node(s) 918. Gateway node(s) 918 generates packet data contexts when a data session is established. To that end, in an aspect, gateway node(s) 918 can include a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can include multiple flows that can be generated through server(s) 914. It is to be noted that in 3GPP UMTS network(s), gateway node(s) 918 (e.g., GGSN) and tunnel interface (e.g., TTG) comprise a packet data gateway (PDG).

Macro network platform 910 also includes serving node(s) 916 that convey the various packetized flows of information or data streams, received through gateway node(s) 918. As an example, in a 3GPP UMTS network, serving node(s) can be embodied in serving GPRS support node(s) (SGSN).

As indicated above, server(s) 914 in macro network platform 910 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can include add-on features to standard services provided by macro network platform 910. Data streams can be conveyed to gateway node(s) 918 for authorization/authentication and initiation of a data session, and to serving node(s) 916 for communication thereafter. Server(s) 914 can also effect security (e.g., implement one or more firewalls) of macro network platform 910 to ensure network's operation and data integrity in addition to authorization and authentication procedures that CS gateway node(s) 912 and gateway node(s) 918 can enact. Moreover, server(s) 914 can provision services from external network(s), e.g., WAN 950, or Global Positioning System (GPS) network(s) (not shown). It is to be noted that server(s) 914 can include one or more processor configured to confer at least in part the functionality of macro network platform 910. To that end, the one or more processor can execute code instructions stored in memory 930, for example.

In example wireless environment 900, memory 930 stores information related to operation of macro network platform 910. Information can include business data associated with subscribers; market plans and strategies, e.g., promotional campaigns, business partnerships; operational data for mobile devices served through macro network platform; service and privacy policies; end-user service logs for law enforcement; and so forth. Memory 930 can also store information from at least one of telephony network(s) 940, WAN(s) 950, or SS7 network 960, enterprise NW(s) 965, or service NW(s) 967.

Femto gateway node(s) 984 have substantially the same functionality as PS gateway node(s) 918. Additionally, femto gateway node(s) 984 can also include substantially all functionality of serving node(s) 916. In an aspect, femto gateway node(s) 984 facilitates handover resolution, e.g., assessment and execution. Further, control node(s) 920 can receive handover requests and relay them to a handover component (not shown) via gateway node(s) 984. According to an aspect, control node(s) 920 can support RNC capabilities.

Server(s) 982 have substantially the same functionality as described in connection with server(s) 914. In an aspect, server(s) 982 can execute multiple application(s) that provide service (e.g., voice and data) to wireless devices served through femto RAN 990. Server(s) 982 can also provide security features to femto network platform. In addition, server(s) 982 can manage (e.g., schedule, queue, format . . . ) substantially all packetized flows (e.g., IP-based, frame relay-based, ATM-based) it generates in addition to data received from macro network platform 910. It is to be noted that server(s) 982 can include one or more processor configured to confer at least in part the functionality of macro network platform 910. To that end, the one or more processor can execute code instructions stored in memory 986, for example.

Memory 986 can include information relevant to operation of the various components of femto network platform 980. For example operational information that can be stored in memory 986 can comprise, but is not limited to, subscriber information; contracted services; maintenance and service records; femto cell configuration (e.g., devices served through femto RAN 990; access control lists, or white lists); service policies and specifications; privacy policies; add-on features; and so forth.

It is noted that femto network platform 980 and macro network platform 910 can be functionally connected through one or more reference link(s) or reference interface(s). In addition, femto network platform 980 can be functionally coupled directly (not illustrated) to one or more of external network(s) 940, 950, 960, 965 or 967. Reference link(s) or interface(s) can functionally link at least one of gateway node(s) 984 or server(s) 986 to the one or more external networks 940, 950, 960, 965 or 967.

Figure 10:
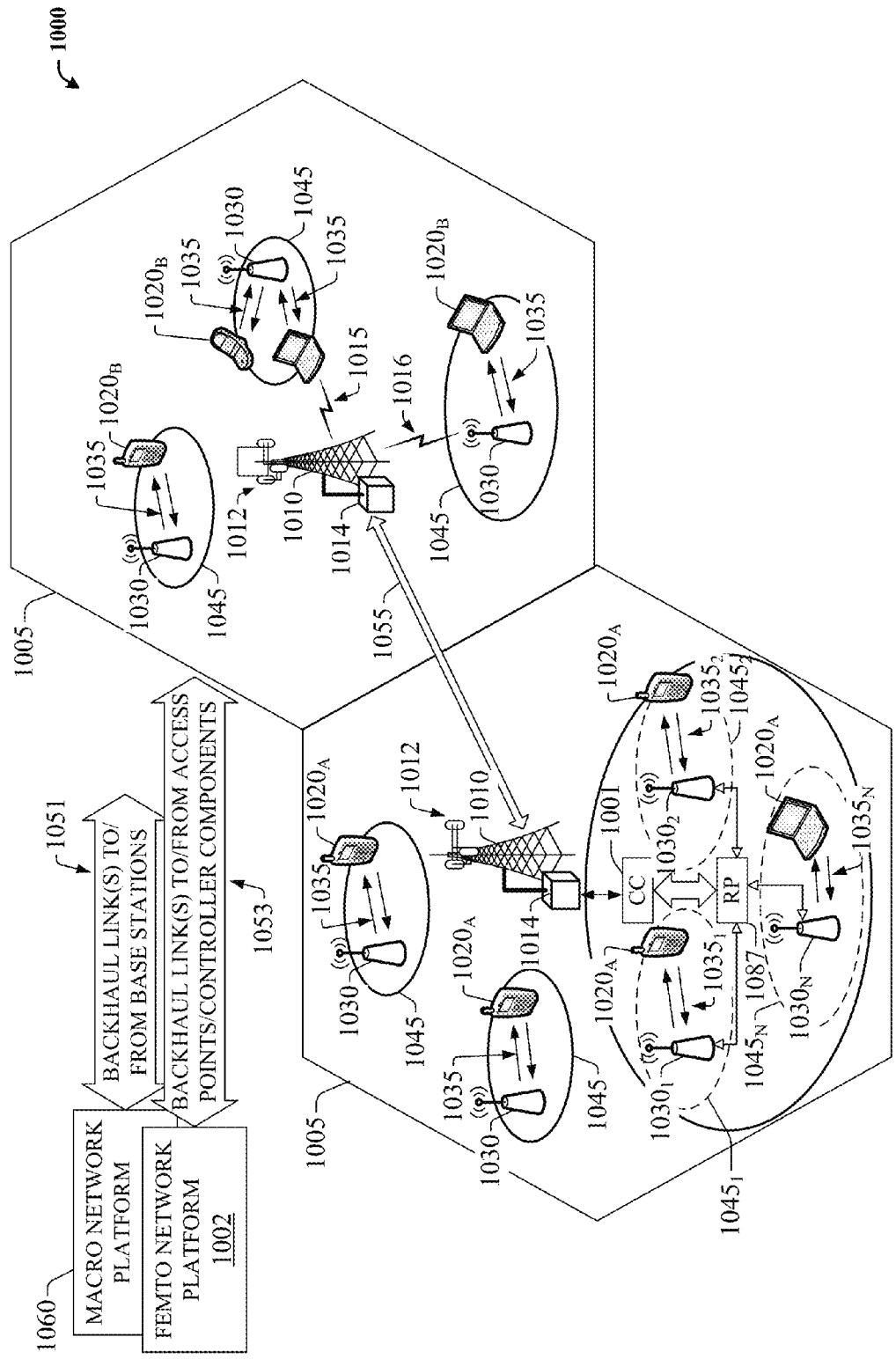
FIG. 10 illustrates a schematic deployment of a macro cell for wireless coverage in accordance with aspects of the subject specification.

FIG. 10 illustrates a wireless environment that includes macro cells and femtocells for wireless coverage in accordance with aspects described herein. In wireless environment 1050, two areas 1005 represent "macro" cell coverage; each macro cell is served by a base station 1010. It can be appreciated that macro cell coverage area 1005 and base station 1010 can include functionality, as more fully described herein, for example, with regard to system 1000. Macro coverage is generally intended to serve mobile wireless devices, like UE $1020_A$, $1020_B$, in outdoors locations. An over-the-air wireless link 105 provides such coverage, the wireless link 1215 comprises a downlink (DL) and an uplink (UL), and utilizes a predetermined band, licensed or unlicensed, of the radio frequency (RF) spectrum. As an example, UE $1020_A$, $1020_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1010 communicates via backhaul link(s) 1051 with a macro network platform 1060, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1060 controls a set of base stations 1010 that serve either respective cells or a number of sectors within such cells. Base station 1010 comprises radio equipment 1014 for operation in one or more radio technologies, and a set of antennas 1012 (e.g., smart antennas, microwave antennas, satellite dish(es) . . . ) that can serve one or more sectors within a macro cell 1005. It is noted that a set of radio network control node(s), which can be a part of macro network platform; a set of base stations (e.g., Node B 1010) that serve a set of macro cells 1005; electronics, circuitry or components associated with the base stations in the set of base stations; a set of respective OTA wireless links (e.g., links 1015 or 1016) operated in accordance to a radio technology through the base stations; and backhaul link(s) 1055 and 1051 form a macro radio access network (RAN). Macro network platform 1060 also communicates with other base stations (not shown) that serve other cells (not shown). Backhaul link(s) 1051 or 1053 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1055 link disparate base stations 1010. According to an aspect, backhaul link 1053 can connect multiple femto access points 1030 and/or controller components (CC) 1001 to the femto network platform 1002. In one example, multiple femto APs can be connected to a routing platform (RP) 1087, which in turn can be connect to a controller component (CC) 1001. Typically, the information from UEs $1020_A$ can be routed by the RP 102, for example, internally, to another UE $1020_A$ connected to a disparate femto AP connected to the RP 1087, or, externally, to the femto network platform 1002 via the CC 1001, as discussed in detail supra.

In wireless environment 1050, within one or more macro cell(s) 1005, a set of femtocells 1045 served by respective femto access points (APs) 1030 can be deployed. It can be appreciated that, aspects of the subject innovation are geared to femtocell deployments with substantive femto AP density, e.g., $10^4$-$10^7$ femto APs 1030 per base station 1010. According to an aspect, a set of femto access points $1030_1$-$1030_N$, with N a natural number, can be functionally connected to a routing platform 1087, which can be functionally coupled to a controller component 1001. The controller component 1001 can be operationally linked to the femto network platform 330 by employing backhaul link(s) 1053. Accordingly, UE $1020_A$ connected to femto APs $1030_1$-$1030_N$ can communicate internally within the femto enterprise via the routing platform (RP) 1087 and/or can also communicate with the femto network platform 1002 via the RP 1087, controller component 1001 and the backhaul link(s) 1053. It can be appreciated that although only one femto enterprise is depicted in FIG. 10, multiple femto enterprise networks can be deployed within a macro cell 1005.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can include legacy telecommunication technologies.

Figure 11:
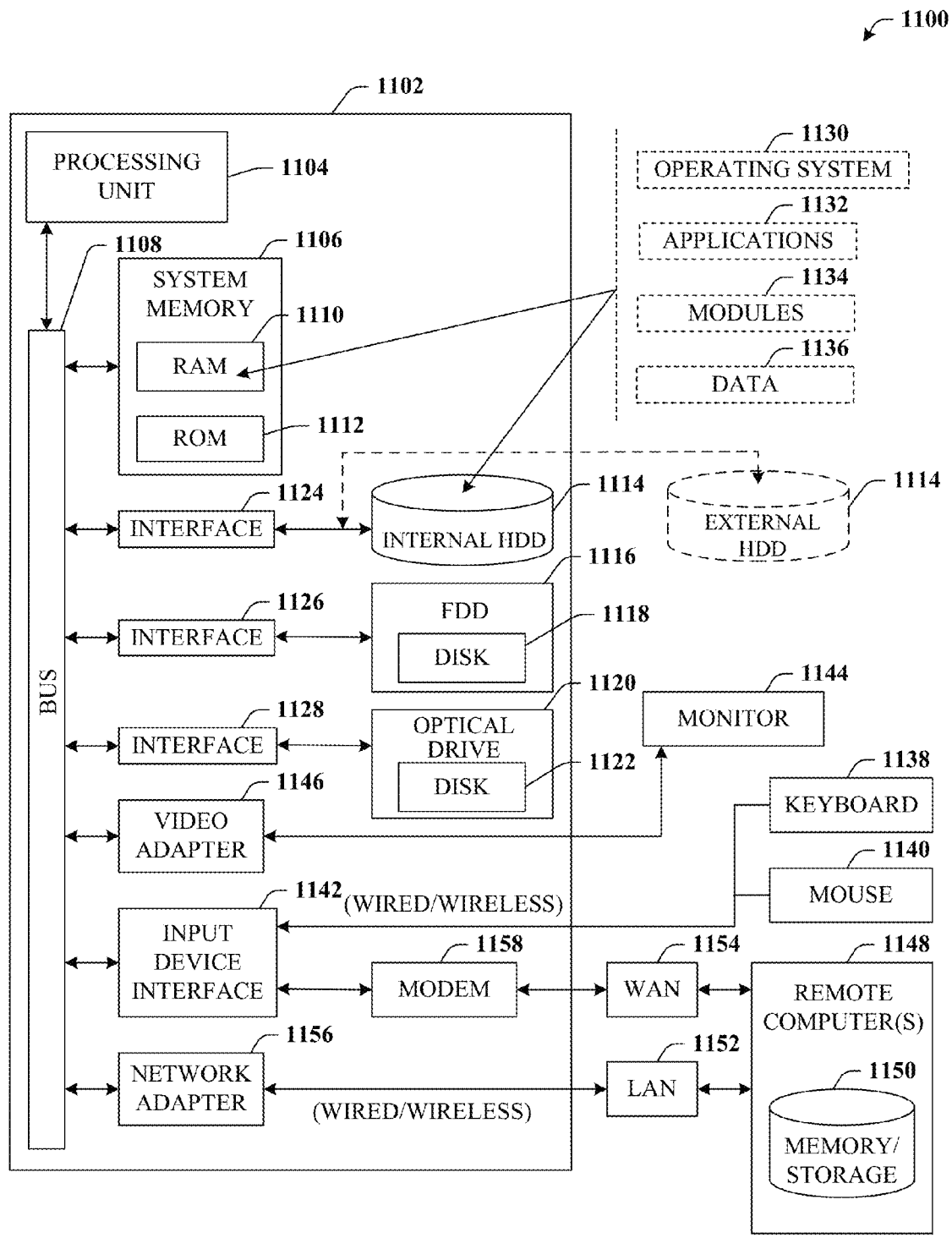
FIG. 11 illustrates a block diagram of a computer operable to execute a portion of the disclosed architecture.

Referring now to FIG. 11, there is illustrated a block diagram of an exemplary computer system operable to execute the disclosed architecture. In order to provide additional context for various aspects of the disclosed subject matter, FIG. 11 and the following discussion are intended to provide a brief, general description of a suitable computing environment 1100 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include either volatile or nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the exemplary environment 1100 for implementing various aspects of the disclosed subject matter includes a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a nonvolatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the disclosed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, a mobile device, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

Various aspects or features described herein can be implemented as a method, apparatus, or article of manufacture using standard programming and/or engineering techniques. In addition, various aspects disclosed in the subject specification can also be implemented through program modules stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the internet or a local area network (LAN). Of course, those skilled in the art will recognize many modifications may be made to this configuration without departing from the scope or spirit of the disclosed subject matter.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory components or memory elements can be removable or stationary. Moreover, memory can be internal or external to a device or component, or removable or stationary. Memory can include various types of media that are readable by a computer, such as hard-disc drives, zip drives, magnetic cassettes, flash memory cards or other types of memory cards, cartridges, or the like.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A non-transitory machine readable storage medium comprising executable instructions that, when executed by a processor, facilitate performance of operations, comprising:
   receiving, from a gateway device, handoff data representing a handoff event that changes a first communication path for a user equipment device to a second communication path;
   in response to determining a handoff issue associated with the handoff event for the user equipment based on the handoff data, generating a notification; and
   transmitting the notification to a mobility management entity device, wherein the notification causes the mobility management entity device to select a different communication path for the user equipment and wherein the different communication path differs from the second communication path.

2. The machine readable storage medium of claim 1, wherein the gateway device is a serving gateway device.

3. The machine readable storage medium of claim 1, wherein the determining the handoff issue is based on count data representing a count of a threshold crossing alarm associated with an evolved nodeB device of the second communication path.

4. The machine readable storage medium of claim 1, wherein the determining the handoff issue is based on an unavailability condition associated with an evolved nodeB device of the second communication path.

5. The machine readable storage medium of claim 1, wherein the determining the handoff issue is based on a degraded air interface between the user equipment and an evolved nodeB device of the second communication path.

6. The machine readable storage medium of claim 1, wherein the determining the handoff issue is based on one of a buffer overflow condition or a packet loss condition associated with an evolved nodeB device of the second communication path.

7. The machine readable storage medium of claim 1, wherein the alternative communication path is associated with an alternate radio access technology that differs from a radio access technology associated with the second communication path.

8. The machine readable storage medium of claim 7, wherein the alternate radio access technology is associated with a communications standard that differs from a communications standard associated with a long term evolution network.

9. The machine readable storage medium of claim 1, wherein the transmitting the notification to the mobility management entity device comprises transmitting the notification to the mobility management entity device prior to a handoff failure associated with the user equipment.

10. The machine readable storage medium of claim 1, wherein the handoff event is directed to a first handoff initiated by an evolved nodeB device associated with the first communication path or a second handoff initiated by the user equipment.

11. A non-transitory machine readable storage medium comprising executable instructions that, when executed by a processor, facilitate performance of operations, comprising:
    receiving handoff data representing a handoff operation that reroutes a first communication path for a user equipment to a second communication path that differs from the first communication path;
    in response to identifying, prompted by the handoff data, a handoff issue associated with the handoff operation, generating a notification comprising an instruction for a mobility management entity device of a long term evolution network to select an alternative communication path for the user equipment, wherein the alternative communication path differs from the second communication path; and
    providing the notification to the mobility management entity device.

12. The machine readable storage medium of claim 11, wherein the identifying the handoff issue is based on count data representing a count of a threshold crossing alarm associated with an evolved nodeB device of the second communication path.

13. The machine readable storage medium of claim 11, wherein the identifying the handoff issue is based on an unavailability condition associated with an evolved nodeB device of the second communication path.

14. The machine readable storage medium of claim 11, wherein the identifying the handoff issue is based on a degraded air interface between the user equipment and an evolved nodeB device of the second communication path.

15. The machine readable storage medium of claim 11, wherein the identifying the handoff issue is based on a buffer overflow condition associated with an evolved nodeB device of the second communication path.

16. A non-transitory machine readable storage medium comprising executable instructions that, when executed by a processor, facilitate performance of operations, comprising:
    receiving, from a gateway device of a long term evolution communication network, handoff data representing a handoff transaction that switches a first communication path for a mobile device to a second communication path that differs from the first communication path; and
    in response to determining a handoff issue associated with the handoff transaction based on the handoff data, determining an alternative communication path for the mobile device, wherein the alternative communication path differs from the second communication path.

17. The machine readable storage medium of claim 16, wherein the receiving the handoff data comprises receiving the handoff data from a serving gateway device.

18. The machine readable storage medium of claim 16, wherein the alternative communication path is associated with an alternate radio access technology that differs from a radio access technology associated with the second communication path.

19. The machine readable storage medium of claim 18, wherein the alternate radio access technology is associated with a communications standard that differs from a communications standard associated with a long term evolution network.

20. The machine readable storage medium of claim 16, wherein the determining the alternative communication path comprises determining the alternative communication path prior to a handoff failure associated with the second communication path.

* * * * *